United States Patent [19]
Brown

[11] Patent Number: 6,079,668
[45] Date of Patent: Jun. 27, 2000

[54] PORTABLE HELIPAD

[75] Inventor: Richard Brown, P.O. Box 801, Gold River, B.C., Canada, V0P 1G0

[73] Assignee: Richard Brown, Gold River, Canada

[21] Appl. No.: 09/007,616

[22] Filed: Jan. 15, 1998

[51] Int. Cl.[7] .................................................. B64F 1/00
[52] U.S. Cl. .................................. 244/114 R; 244/110 E
[58] Field of Search .......................... 244/114 R, 110 E, 244/115, 116; 405/202; 52/6, 7, 646, 637, 648, 638, 146, 693, 695; 108/132, 160, 36, 37; 182/179, 170

[56] References Cited

U.S. PATENT DOCUMENTS

| | | |
|---|---|---|
| 2,920,846 | 1/1960 | Lingafelter . |
| 3,037,727 | 6/1962 | Grundy . |
| 3,147,940 | 9/1964 | Laufer . |
| 3,489,380 | 1/1970 | Vanderlip . |
| 3,563,042 | 2/1971 | Ryan ........................................ 405/202 |
| 3,616,111 | 10/1971 | Raech . |
| 4,104,835 | 8/1978 | Bardwick, III ................................ 52/7 |
| 4,116,408 | 9/1978 | Soloy . |
| 4,202,646 | 5/1980 | Herstad . |
| 4,833,998 | 5/1989 | Everett et al. ........................... 108/132 |
| 4,834,321 | 5/1989 | Granger .................................... 244/115 |
| 5,067,669 | 11/1991 | Van Horn et al. . |
| 5,351,915 | 10/1994 | Aandalen . |

OTHER PUBLICATIONS

H&H Welding Fabrication & Rental Ltd., Portable Helipad System, undated.

Primary Examiner—Galen L. Barefoot

[57] ABSTRACT

A portable helipad adapted for use in rough terrain and for transport in a fully assembled state by a helicopter. A deck is supported by legs depending from the deck. Leg braces extending from the legs connect to brackets within an associated zone of attachment on the underside surface of the deck. The helicopter releasably engages the portable helipad for transport. The legs and associated leg braces are preferably extensible to permit the deck to be levelled over uneven terrain.

5 Claims, 7 Drawing Sheets

PORTABLE HELIPAD

FIELD OF THE INVENTION

This invention relates to helicopter landing pads, and more particularly to portable landing pads adapted for transport by a helicopter.

BACKGROUND PRIOR ART

In helicopter logging and mineral exploration operations, it is often necessary to land a helicopter in remote areas that are characterised by uneven or multi-pitched terrain that is at least partially covered with obstacles such as boulders or stumps. Accordingly, helicopter landing pads must typically be constructed at such remote locations before the helicopter logging or mineral exploration operations may begin.

It is standard procedure in the helicopter logging and mining industries to construct helicopter landing pads on-site from timber and other materials that may be available. However, such wooden landing pads are difficult and very time consuming to build. In some cases, it is additionally necessary to first collect and retrieve suitable timber and materials over a large area before the building of the helicopter landing pad may be commenced. Significant quantities of timber and materials may be required, since (depending upon the terrain) a wooden landing pad may have to be tiered in several stages in order to allow for proper clearance for the helicopter rotor. Owing to the variability in timber supplies and other materials suitable for the construction of a wooden helicopter landing pad that one may find at any given remote location, wooden landing pads are of non-uniform construction; this leads to an increased likelihood that a given wooden landing pad may be insufficiently strongly constructed and may collapse.

Previously known portable helicopter landing pads have been proposed for use in the helicopter logging and mining industries and in other operations where it may be necessary to land a helicopter on uneven or multi-pitched terrain covered with obstacles, but have been found to be unsuitable for use in such rugged terrain due primarily to their cost, complexity, and/or poor ground clearance. In U.S. Pat. No. 3,489,380, Vanderlip discloses a portable helicopter landing pad that is designed to permit the landing of troops and supplies in densely foliated areas, but that must be set upon a relatively level clearing if one is to be able to land the helicopter itself upon it. Soloy, in U.S. Pat. No. 4,116,408, discloses a portable helicopter landing pad having a folding deck, which must be folded before the landing pad may be transported by a helicopter. Telescopically extensible legs are provided for in the Soloy pad in order that it may be set upon non-level ground; however, since a folding deck is more susceptible to unwanted collapse, the foldable deck structure requires the use of multiple braces between the legs in a configuration that significantly interferes with ground clearance, thereby rendering the Soloy pad unsuitable for use in rugged terrain. In addition, since it is often advantageous in helicopter logging and mining operations to quickly and repeatedly relocate a portable helicopter landing pad (as the worksite progresses), the requirement that the Soloy pad be folded before it may be transported limits its utility in such operations.

SUMMARY OF THE INVENTION

These disadvantages may be overcome by providing a portable helicopter landing pad of simple and economical construction that may be carried in a fully assembled state beneath a helicopter, and quickly set up over obstacles present at a remote landing site. An object of one aspect of the present invention is to provide an improved portable helipad possessing these qualities.

In accordance with one aspect of the present invention, there is provided a portable helipad comprising a deck supported by plural legs, of which at least one is extensible. Leg braces extending from the legs connect to associated brackets (or other suitable means of attachment) within associated zones of attachment on the underside surface of the deck, thereby increasing the ground clearance of the inventive portable helipad as compared to certain prior portable helipads in which leg braces extended from one leg to another. Preferably, the associated bracket of each leg brace is located (within the associated zone of attachment of such leg brace on the underside of the deck) so as to minimize the likelihood of engagement of the deck support structure with ground obstructions. One suitable location is in the vicinity of the peripheral margin of the deck at the boundary equidistant between the leg to which such leg brace is attached and the nearest other leg. Advantageously, the leg braces are in compression under load, in order that some portion of any load applied to the portable helipad is supported by the leg braces. This allows for the use of less material in the construction of the deck, since all load is not concentrated in the vicinity of the legs. Reduced deck material allows for the construction of a lighter portable helipad. Conveniently, the legs and leg braces of the portable helipad are releasably secured to the deck by pins or the like in order that the portable helipad may be rapidly assembled and disassembled without the use of tools.

In accordance with a further aspect of the present invention, there is provided the combination of a helicopter and a portable helipad comprising a deck supported by a suitable number of legs, of which at least one is extensible. Leg braces extending from the legs connect to associated brackets (say) within associated zones of attachment on the underside surface of the deck. Deck engagement means on the underside of the helicopter releasably attach the portable helipad to the helicopter, and helicopter engagement means secured to the deck complement the deck engagement means. Preferably, the deck is constructed of an open-weave material so as to reduce wind loading on the portable helipad during transport, to reduce the overall weeight of the portable helipad, and to allow precipitation (primarily snow) to fall through the open-weave material so as to resist build-up (of snow) on the portable helipad when it is situated at a remote location.

BRIEF DESCRIPTION OF THE DRAWINGS

In drawings which illustrate embodiments of the invention.

DETAILED DESCRIPTION OF THE INVENTION

Figure 1:
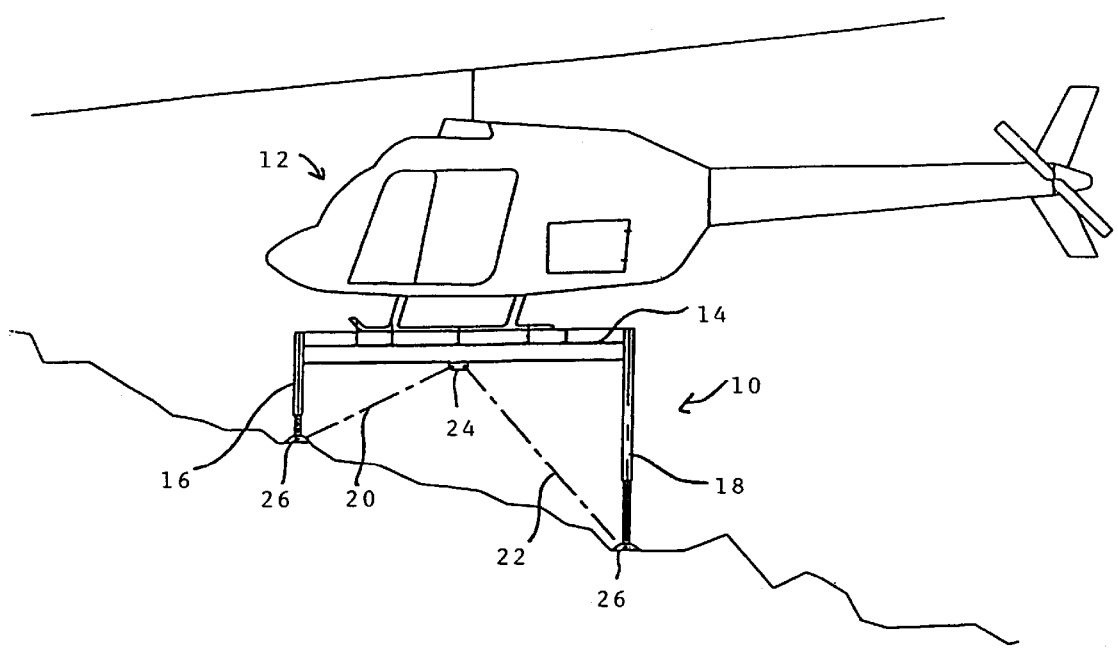
FIG. 1 is a sectional side elevation view of a portable helipad forming one embodiment of the present invention with a helicopter resting thereupon.

In FIG. 1, the portable helipad illustrated and generally designated 10 includes a deck 14 supported by short extensible legs 16 (one shown) and long extensible legs 18 (one shown). Short and long extensible legs are provided in order to facilitate the use of the illustrated portable helipad on sloped terrain. Short and long extensible leg braces 20 and 22 (seen as dotted lines in FIG. 1) extend respectively from ground engagement and anchoring platforms 26 at the distal end of each extensible leg 16 and 18 to brackets 24 fastened to the underside surface of deck 14 within the associated zones of attachment of both leg braces 20 and 22, (the associated zones of attachment being defined with respect to each leg brace as the region that lies between the top of the leg to which such leg brace is connected and a boundary that is substantially equidistant from the top of that leg and the top of the nearest other leg, but not extending beyond the boundary of equidistance between the top of that leg and the top of the nearest other leg at any particular point along the boundary). In the Figures, the illustrated bracket 24 is located at a point on the underside surface of deck 14 adjacent the peripheral margin of deck 14 that is substantially equidistant between short leg 16 and long leg 18. A helicopter 12 is illustrated resting on top of the portable helipad 10 as deployed on sloped and multi-pitched terrain.

Although not shown in the embodiment of the invention illustrated in the drawings, it will be clear to those skilled in helipad design that not all of the legs supporting deck 14 are required to be extensible; if one or more of the legs are non-extensible, the deck 14 may nevertheless in most cases be put into a generally horizontal plane regardless of the terrain upon which the portable helipad is set, by appropriate adjustment of some or all of the remaining extensible legs. It will also be clear to those skilled in helipad design that leg braces 20 and 22 may advantageously be connected to brackets located at any point within their associated zones of attachment, most preferably substantially adjacent the peripheral margin of the deck at the boundary equidistant between the leg to which such leg brace is attached and the nearest other leg.

Figure 2:
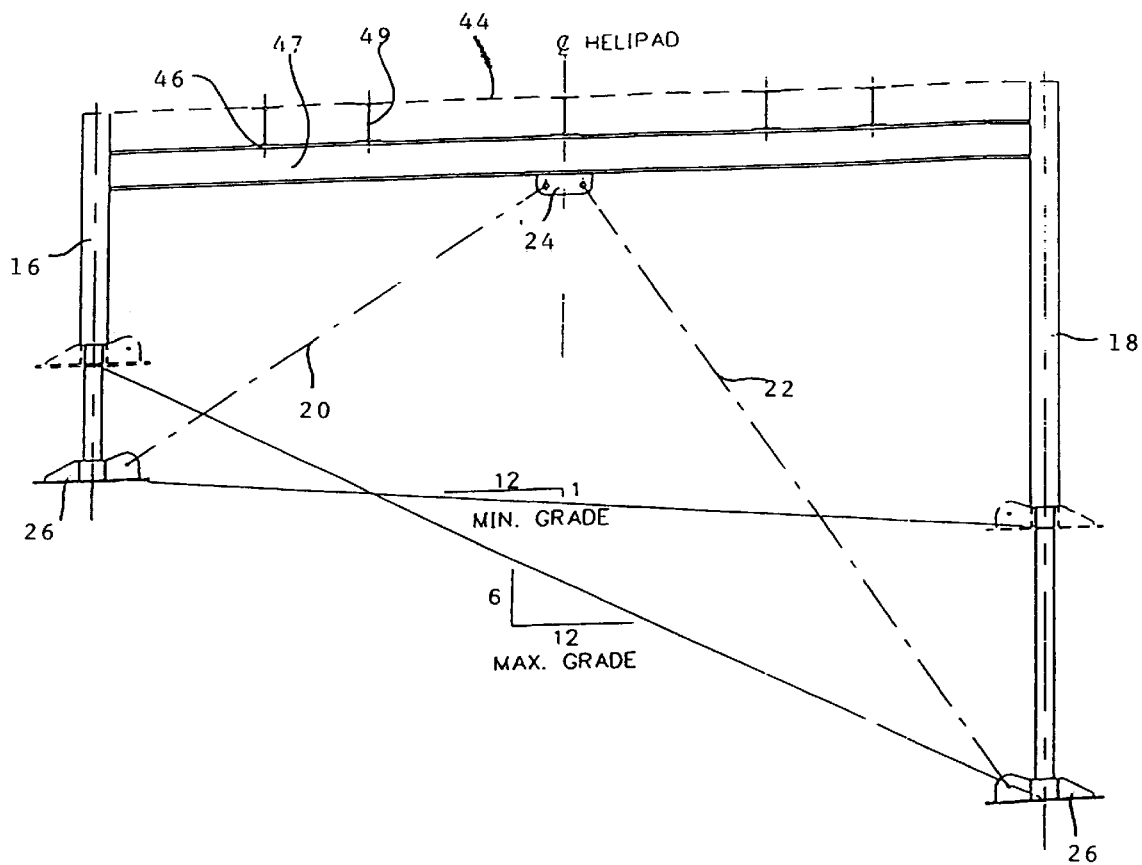
FIG. 2 shows the portable helipad of FIG. 1 in a side elevation view.
Figure 3:
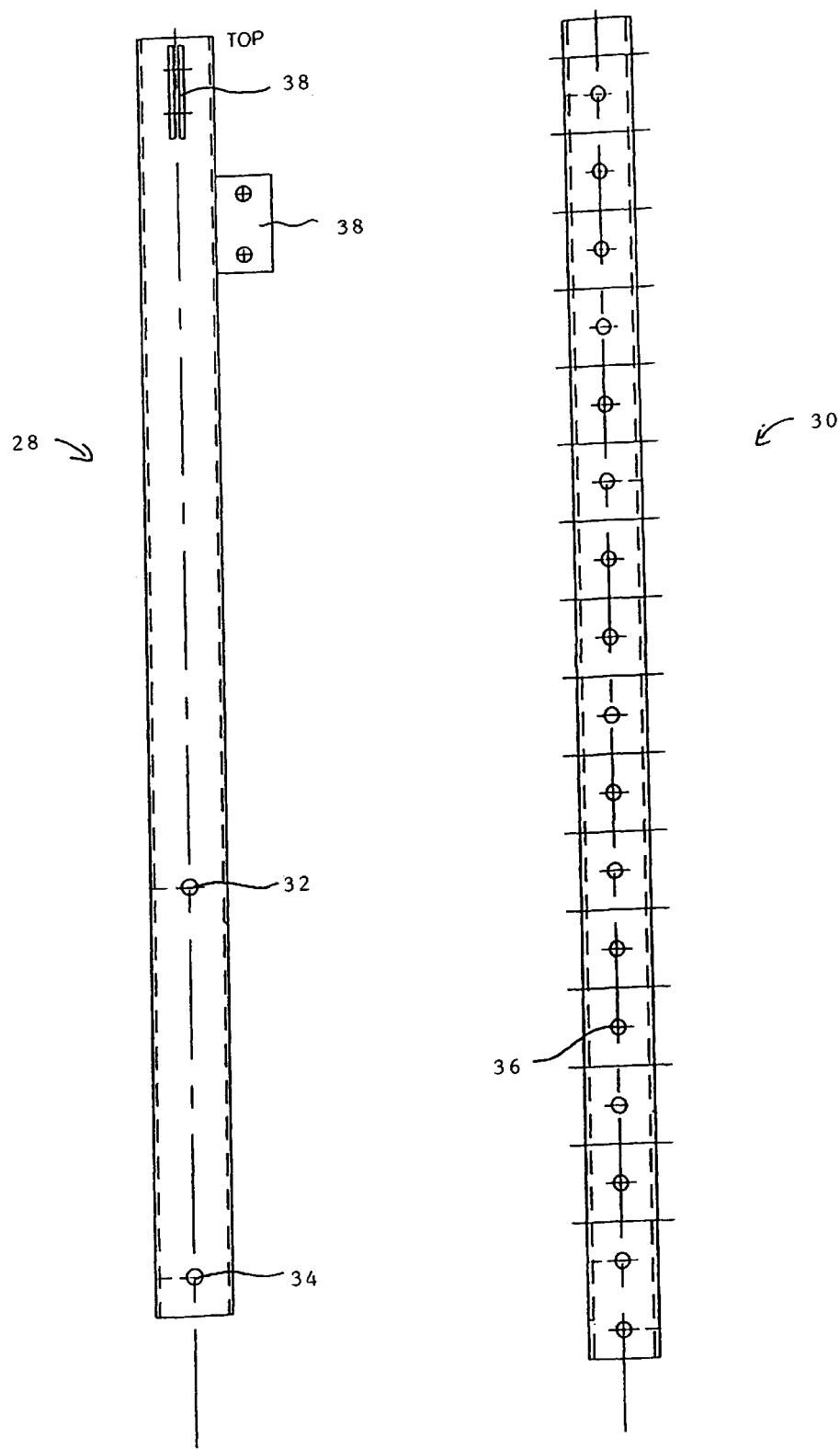
FIG. 3 is an enlarged exploded view of an extensible leg of the portable helipad of FIG. 1.
Figure 4:
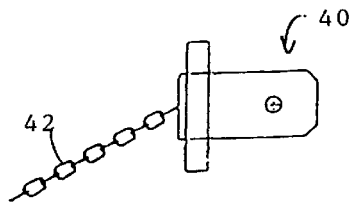
FIG. 4 is an enlarged view of a pin of the portable helipad of FIG. 1.

As is best seen in FIG. 3, each extensible leg comprises an upper segment 28 which is releasably secured to deck 14 by flanges 38 (discussed further below), and a replaceably removable lower extensible segment 30 that is sized to slidingly engage the upper segment 28. Both the upper segment 28 and lower extensible segment 30 of the short extensible legs 16 are shorter than are the corresponding segments 28 and 30 of the long extensible legs 18; see FIG. 2. Spaced-apart holes 32 and 34 are provided in upper segment 28 at a distance from one another that corresponds to an integral multiple of the distance between spaced-apart holes 36 provided along the entire length of lower extensible segment 30. The length of each extensible leg is fixed following longitudinal adjustment (by sliding lower extensible segment 30 relative to upper segment 28) by inserting pins 40 (FIG. 4) through holes 32, 36 and 34, 36 in the upper segment 28 and lower extensible segment 30 of each extensible leg. The pins 40 may be secured in place with cotter clips (not shown), and are fastened to upper segment 28 by a chain 42 to prevent loss of same.

Various combinations of long or short lower extensible segments 30 may be fitted to upper segments 28 of each extensible leg 16 or 18 as needed in order to maintain deck 14 in a generally horizontal plane when positioning the portable helipad over various terrain and obstacles. FIG. 2 indicates the maximum and minimum slopes upon which the portable helipad may be positioned when all of the short-leg lower extensible segments 30 are used together with the short-leg upper segments 28, and all of the long-leg lower extensible segments 30 are used together with the long-leg upper segments 28.

Figure 8:
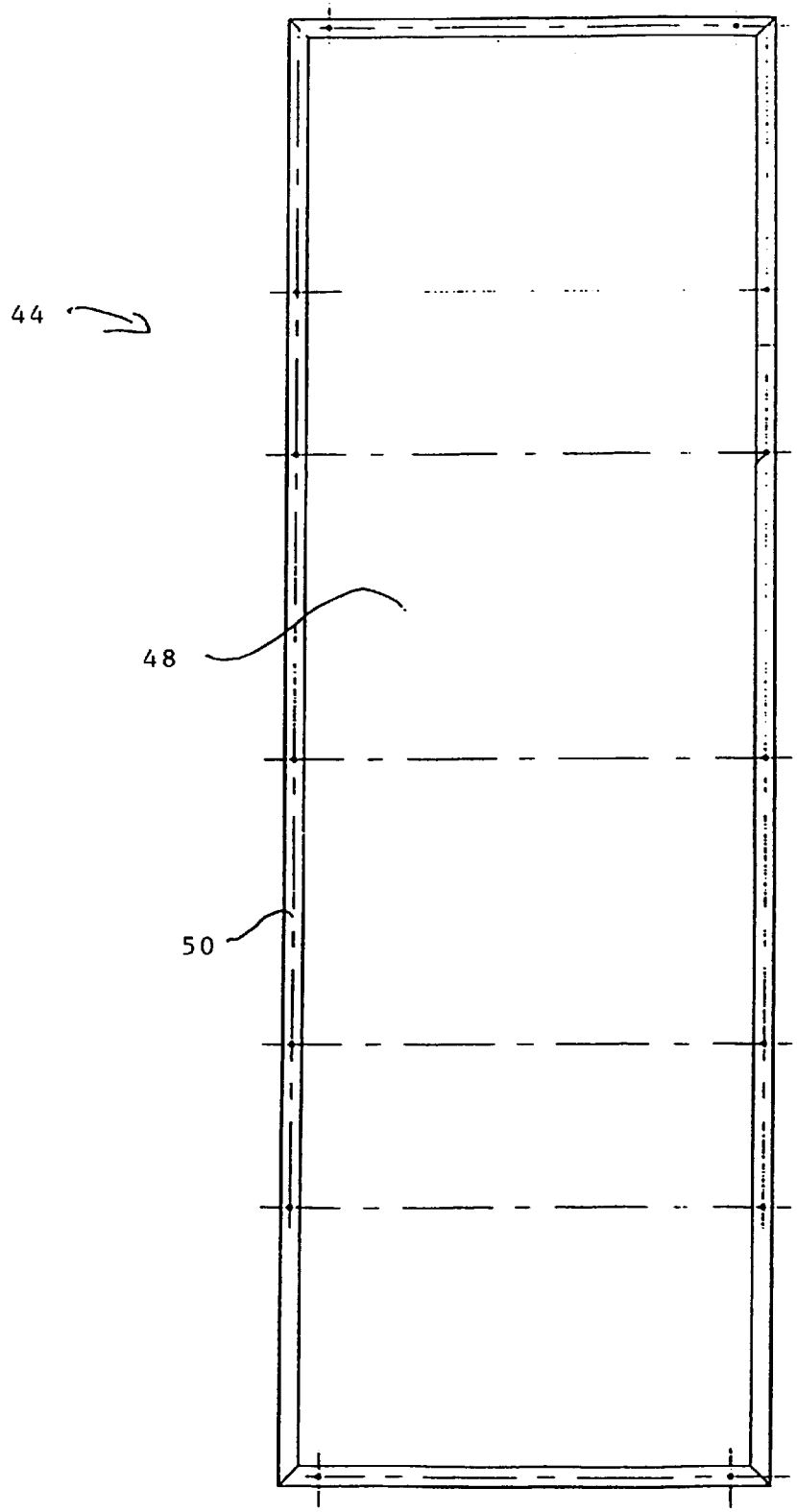

As seen in FIGS. 1 and 2, deck 14 includes deck panels 44 (shown as a dotted line) releasably affixed to the upper surface of framework 46, the framework 46 comprising side I-beams 47 and plural cross I-beams 49 releasably secured together with pins 40. Deck panels 44 further comprise an open weave mesh landing surface 48 and a panel frame 50 to which mesh landing surface 48 is rigidly affixed; see FIG. 8. Releasable attachment of deck panels 44 to framework 46 is accomplished by means of pins 40, which engage through holes (not shown) in the side I-beams 47 and plural cross I-beams 49 and corresponding holes (not shown) in panel frame 50. Hooks of a conventional sort (not shown) for releasable securement of the helicopter 12 to the portable helipad during shutdown (to prevent the helicopter 12 from being blown off of portable helipad 10 by strong winds) penetrate the open weave mesh landing surface 48 and are removably affixed to cross I-beams 49 with bolts (not shown). Eyes (not shown) are provided in the vicinity of the corners of deck 14 for releasably attaching portable helipad 10 to corresponding deck engagement means such as cables (not shown) of the sort conventionally used for attaching cargo to the underside of helicopter 12. Alternatively, cables (not shown) may be rigidly affixed directly to deck 14. In either cable arrangement, it will be clear to those skilled in helipad design and to those skilled in the piloting of helicopters that any forwardly disposed cables should preferably be longer than any rearwardly disposed cables, in order that the portable helipad 10 may fly level, and that a flag or other means to create drag may be releasably affixed to the portable helipad in order to prevent the portable helipad from spinning during transport.

Figure 5:
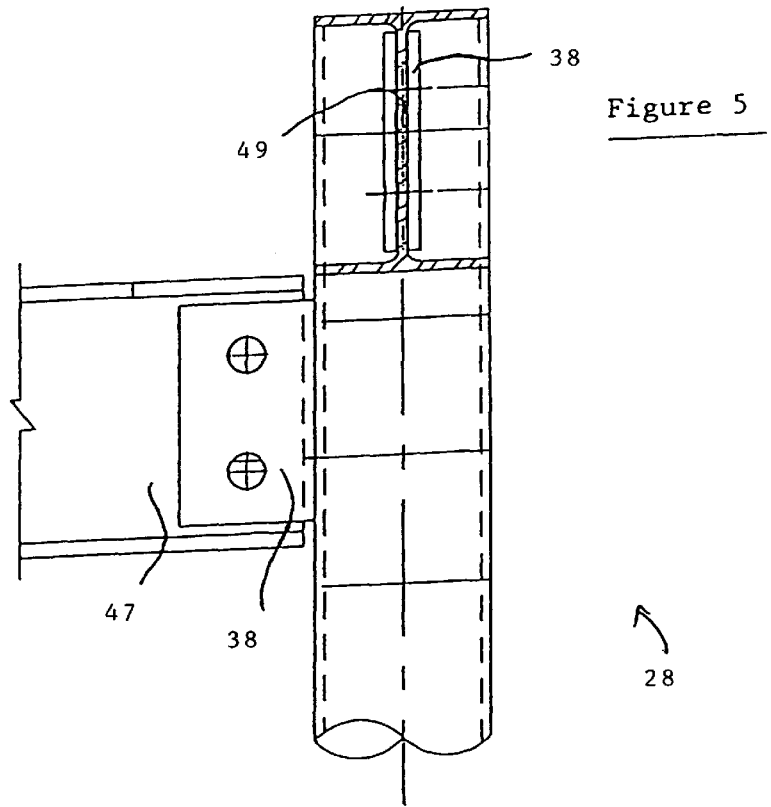
FIG. 5 is an enlarged partially sectional view of the connection between the deck and a leg of the portable helipad of FIG. 1.

Legs (including both the short and long extensible legs 16 and 18, and any non-extensible legs [not shown]) are releasably secured to deck 14 by pins 40 joining flanges 38 on the upper end of each leg to the free ends of side I-beams 47 and end cross I-beams 49; see FIG. 5. Alternatively, it will be clear to those skilled in the art of helipad design that legs 16 and 18 may be releasably fastened to sockets (not shown) rigidly affixed to framework 46.

Figure 6:
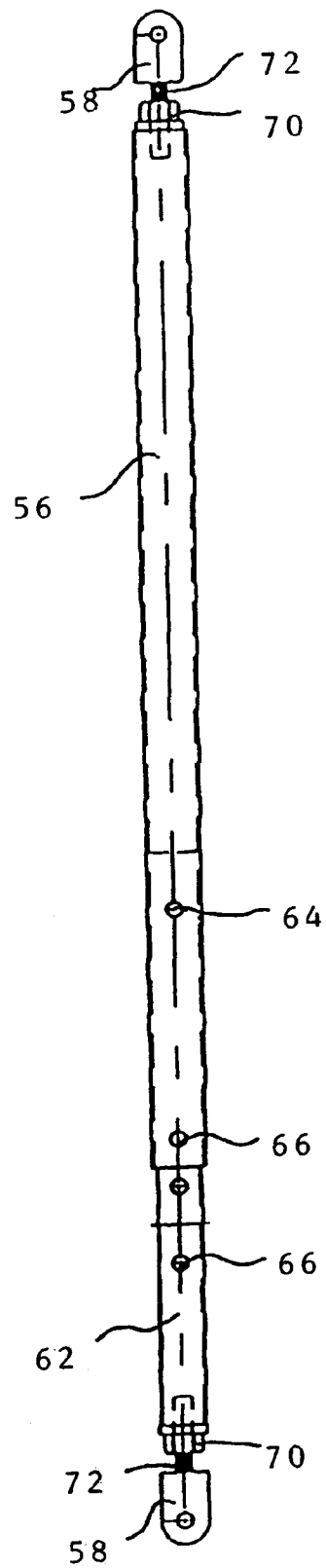
FIG. 6 is an enlarged view of an extensible leg brace of the portable helipad of FIG. 1.

As seen in FIG. 6, each of the short and long extensible leg braces 20 and 22 comprises an upper brace segment 56 releasably secured to an associated bracket 24 by a pin 40 engaging threaded flange 58, and a replaceably removable lower extensible brace segment 62. A ground engagement and anchoring platform 26 is releasably secured to threaded flange 58 at the free end of lower extensible brace segment 62 by a pin 40; see FIG. 2. Spaced-apart holes 64 and 66 are provided in upper brace segment 56 at a distance from one another that corresponds to an integral multiple of the distance between spaced-apart holes 68 provided along the entire length of lower extensible brace segment 62. The length of each extensible leg brace is determined in gross by inserting pins 40 through holes 64,68 and 66,68 following longitudinal adjustment by sliding lower extensible brace segment 62 relative to upper brace segment 56. Then, further fine adjustment of the length of each leg brace (including both the short and long extensible leg braces 20 and 22, and any non-extensible leg braces [not shown]) may be effected by rotating the leg brace, so as to cause the threading-in or threading-out of threaded flanges 58 at both ends of the leg brace through matingly threaded ends 70 of the leg brace. The thread pitch 72 of threaded flanges 58 and of threaded ends 70 is the same in magnitude but opposite in direction at the top and bottom ends of each leg brace in order to allow for the tightening or slackening of the leg brace by rotation as described.

Figure 7:
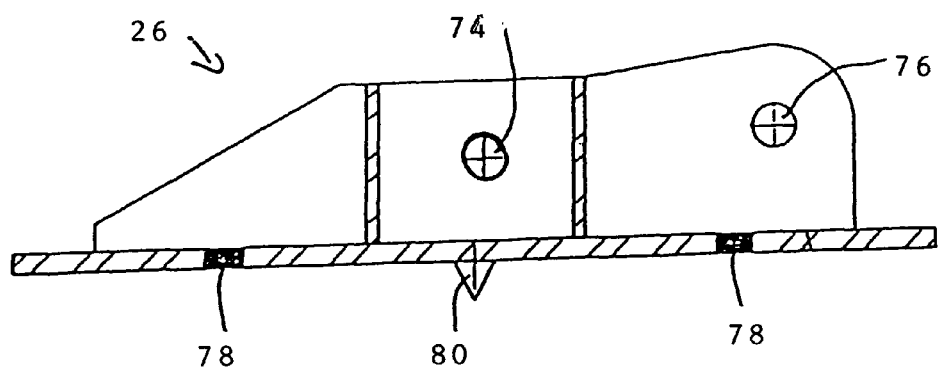
FIG. 7 is an enlarged partially sectional elevation view of the ground engagement and anchoring platform of the portable helipad of FIG. 1; and, FIG. 8 is a plan view of a deck panel of the portable helipad of FIG. 1.

FIG. 7 shows the ground engagement and anchoring platforms 26 that are attached to the distal end of legs 16 and 18 (and any non-extensible legs [not shown]), and to leg braces 20 and 22 by pins 40. Pin 40 is engaged to a platform 26 and a leg through hole 74, and a separate pin 40 engages a threaded flange 58 of a leg brace 20 or 22 through hole 76. The ground engagement and anchoring platforms 26 are perforated at points 78 to facilitate spiking to stumps or the ground (not shown) upon which portable helipad 10 is positioned, and spike 80 is provided in order to limit the translational movement of portable helipad 10 with respect to the surface upon which the portable helipad 10 is positioned.

Alternative embodiments may exist which are within the scope of the invention, whose scope is defined in the appended claims. The shape of the deck, the number and extensibility of legs, the positioning of leg brace brackets on the underside surface of the deck within the associated zone of attachment for each leg brace, the preferred manner of effecting connections or attachments, the mechanical means chosen to permit extensibility, and other mechanical details are all variable and within the ordinary skill of helipad designers.

What is claimed is:

1. A portable helipad, comprising a deck having a top surface, an underside surface, and a peripheral margin;

a plurality of legs depending from the deck for supporting the deck, the plurality of legs comprising at least one extensible leg;

and a plurality of leg braces, at least one leg brace extending from each one of the plurality of legs to an attachment means within an associated zone of attachment on the underside surface of the deck, said zone being defined for each such leg by the region that lies between the top of such leg and a boundary that is substantially equidistant from the top of that leg and the top of the nearest other leg, said zone not extending beyond the boundary of equidistance between that leg and the nearest other leg, wherein each extensible leg comprises an upper segment secured to the deck, and a lower extensible segment longitudinally adjustable relative to the upper segment, and wherein at least one of the plurality of leg braces is extensible, each said extensible leg brace extending from the lower extensible segment of an extensible leg to its associated attachment means.

2. The portable helipad of claim 1, wherein the lower extensible segment of each extensible leg is replaceably removable from the upper segment, such that it may be interchanged with a lower extensible segment of different length, and wherein any leg braces extending from the lower extensible segment of each extensible leg are replaceably removable from their respective associated attachment means.

3. The portable helipad of claim 1, wherein the extensible legs and extensible leg braces are adjustable by pin means, in order that the portable helipad may rapidly be adjusted to suit the terrain upon which it is set without the use of tools.

4. The portable helipad of claim 2, wherein the extensible legs and extensible leg braces are adjustable by pin means, in order that the portable helipad may rapidly be adjusted to suit the terrain upon which it is set without the use of tools.

5. A portable helipad, comprising a deck having a top surface, an underside surface, and a peripheral margin;

a plurality of legs depending from the deck for supporting the deck, the plurality of legs comprising at least one extensible leg;

and a plurality of leg braces, at least one leg brace extending from each one of the plurality of legs to an attachment means within an associated zone of attachment on the underside surface of the deck, said zone being defined for each such leg by the region that lies between the top of such leg and a boundary that is substantially equidistant from the top of that leg and the top of the nearest other leg, said zone not extending beyond the boundary of equidistance between that leg and the nearest other leg, wherein the legs and leg braces are releasably secured to the deck by pin means, in order that the portable helipad may be rapidly assembled and disassembled without the use of tools, and wherein the extensible legs and extensible leg braces are adjustable by pin means, in order that the portable helipad may rapidly be adjusted to suit the terrain upon which it is set without the use of tools.

* * * * *